(12) United States Patent
Ochab et al.

(10) Patent No.: US 7,410,042 B2
(45) Date of Patent: Aug. 12, 2008

(54) SELF-ENERGIZING PUMP FOR OVERRUNNING CLUTCH

(75) Inventors: David C. Ochab, Horseheads, NY (US); Brendan Brewer, Elmira, NY (US); Matthew J. Cowen, Horseheads, NY (US); Kelly P. Heath, Corning, NY (US); John M. Hasson, Jr., Elmira, NY (US)

(73) Assignee: The Hilliard Corporation, Elmira, NY (US)

( * ) Notice: Subject to any disclaimer, the term of this patent is extended or adjusted under 35 U.S.C. 154(b) by 99 days.

(21) Appl. No.: 11/449,109

(22) Filed: Jun. 8, 2006

(65) Prior Publication Data

US 2007/0286743 A1     Dec. 13, 2007

(51) Int. Cl.
*F16H 48/12* (2006.01)
*F16D 47/04* (2006.01)

(52) U.S. Cl. .............................. 192/48.92; 192/103 F; 74/650

(58) Field of Classification Search ................. 192/54.3; 417/15
See application file for complete search history.

(56) References Cited

U.S. PATENT DOCUMENTS

| | | |
|---|---|---|
| 1,823,389 A | 9/1931 | Lavaud |
| 2,865,228 A | 12/1958 | Weismann |
| 2,908,181 A * | 10/1959 | Smirl ........................ 417/292 |
| 3,124,972 A | 3/1964 | Seliger et al. |
| 3,262,526 A | 7/1966 | Kramer |
| 3,447,396 A | 6/1969 | Seliger |
| 3,500,977 A | 3/1970 | Gehrke |
| 3,581,597 A | 6/1971 | Reiersgaard |
| 3,630,330 A | 12/1971 | Pflugner |
| 3,700,082 A | 10/1972 | Schwab |
| 3,863,742 A | 2/1975 | Elmore et al. |
| 3,935,753 A | 2/1976 | Williams |
| 4,373,407 A | 2/1983 | Okubo |
| 4,434,878 A | 3/1984 | Okubo |
| 4,620,806 A | 11/1986 | Rabe |
| 4,681,180 A | 7/1987 | Oyama et al. |
| 4,782,720 A | 11/1988 | Teraoka et al. |
| 4,787,491 A | 11/1988 | Kato |

(Continued)

FOREIGN PATENT DOCUMENTS

DE          430321       6/1926

(Continued)

*Primary Examiner*—Rodney H Bonck
(74) *Attorney, Agent, or Firm*—Drinker Biddle & Reath LLP

(57) ABSTRACT

A pump includes a cam member and an armature plate received on an input shaft rotatably supported with a differential housing of a clutch. The pump also includes a cylinder rod slidingly received in a chamber of a master cylinder to pressurize a hydraulic fluid. The cam member includes a ring and a back plate. The ring has an outer, preferably symmetrical, surface with a variable radius defining a ramped portion for outwardly driving the cylinder rod when the cam member is rotated either forward or backward with respect to the differential housing. A coil generates an electromagnetic field when activated drawing the cam member towards the armature plate such that contact forces causes the cam member to rotate with the armature plate. A roller disc is rotatably supported at one end of the cylinder rod for rolling contact between the cylinder rod and the cam surface of the cam member ring.

23 Claims, 10 Drawing Sheets

U.S. PATENT DOCUMENTS

| | | |
|---|---|---|
| 4,940,123 A | 7/1990 | Sayama |
| 4,960,011 A | 10/1990 | Asano |
| 5,025,902 A | 6/1991 | Imai et al. |
| 5,036,939 A | 8/1991 | Johnson et al. |
| 5,070,745 A | 12/1991 | Lindsey et al. |
| 5,189,930 A | 3/1993 | Kameda |
| 5,203,232 A | 4/1993 | Ito et al. |
| 5,348,126 A | 9/1994 | Gao |
| 5,388,669 A * | 2/1995 | Holl et al. .................. 192/35 |
| 5,411,123 A * | 5/1995 | Rej et al. ................ 192/85 AA |
| 5,511,642 A | 4/1996 | Klotz et al. |
| 5,845,546 A | 12/1998 | Knowles et al. |
| 5,971,123 A | 10/1999 | Ochab et al. |
| 6,092,634 A | 7/2000 | Kremer et al. |
| 6,622,837 B2 | 9/2003 | Ochab et al. |

FOREIGN PATENT DOCUMENTS

| | | |
|---|---|---|
| JP | 59-86747 | 5/1984 |

* cited by examiner

SELF-ENERGIZING PUMP FOR OVERRUNNING CLUTCH

FIELD OF THE INVENTION

The present invention relates generally to clutches, and more particularly to a bi-direction overrunning clutch utilizing hydraulic pressure.

BACKGROUND OF THE INVENTION

Motorized vehicles include differentials for transferring torque from a drive shaft to driven shafts attached to wheels of the vehicle. Some differentials include an overrunning clutch providing four-wheel drive capability for transmitting torque to driven shafts of the vehicle as needed. U.S. Pat. No. 6,622,837 discloses a bi-directional overrunning clutch having roll cages shifted by application of an electromagnetic field into a position providing four-wheel drive capability in which slippage of primary drive wheels causes the rolls to become wedged between the tapered surfaces of a clutch housing and a race. The wedging of the rolls results in torque transfer between the clutch housing and the race.

The clutch of the '837 patent also provides engine braking capability ("backdriving") for use during steep descents. In the backdriving mode, the drive shaft of the vehicle becomes engaged by the driven shafts such that the drive shaft is actually driven by the driven shafts. The clutch of the '837 patent includes a clutch pack assembly having friction plates and drive plates interleaved with each other. The friction plates and drive plates are respectively engaged with the clutch housing and a driven shaft. When the backdriving feature is inactive, the friction plates and drive plates are free to rotate with respect to each other.

The clutch pack assembly of the '837 patent includes a hydraulic piston actuated by pressurized fluid from a hydraulic pressure source to apply pressure to the friction plates and drive plates. The pressure applied by the hydraulic piston forces to the friction plates and drive plates to rotate together such that the clutch housing and the driven shaft are engaged to each other. In the clutch of the '837 patent, the hydraulic pressure source supplying pressurized fluid to the clutch pack assembly is external to the clutch.

SUMMARY OF THE INVENTION

According to the present invention, a pump assembly that can be used with a bi-directional overrunning clutch includes a pump housing, cylinder rod, cam member and a rotation coupler. The pump housing defines an interior in which a cylinder rod is slidingly received for pressurizing a hydraulic fluid. The cam member is adapted for receipt on a shaft such that the shaft is capable of relative rotation with respect to the cam member about a central axis defined by the shaft. The cam member includes a cam surface adapted to drivingly slide the cylinder rod with respect to the pump housing upon relative movement of the cam member with respect to the pump housing.

The rotation coupler is carried by the shaft such that the rotation coupler rotates with the shaft. The rotation coupler is adapted for engagement with the cam member such that rotation of the shaft results in relative movement between the cam member and the pump housing to slide the cylinder rod with respect to the pump housing and pressurize a hydraulic fluid.

According to one embodiment of the invention, the shaft is an input shaft adapted for engagement with a drive system of the vehicle for rotation of the input shaft by the drive system. The input shaft is rotatably supported within the interior of the differential housing. The pump housing interior in which the cylinder rod is slidingly received is an interior chamber defined by a master cylinder.

According to one exemplary embodiment, the rotation coupler is an armature plate defining a central opening and including splines spaced about the central opening to engage a splined portion of the input shaft. The cam member includes a ring and a back plate. The ring is connected to the back plate such that the ring extends from one side of the back plate. The ring includes an outer cam surface having a radius that varies about a circumference of the ring including at least one ramped portion.

According to this embodiment, the pump assembly includes a coil located next to the armature plate and adapted to generate an electromagnetic field when activated such that the cam member and the armature plate are drawn into contact with each other. The contact results in a friction force between the armature plate and cam member back plate during rotation of the armature plate such that the cam member is rotated with respect to the differential housing. The cylinder rod and cam member are arranged such that the cylinder rod is driven by the ramped portion of the cam member when the coil is activated to rotate the cam member with respect to the differential housing.

Preferably, the pump assembly includes a roller disc rotatably supported at one end of the cylinder rod to provide rolling contact between the cylinder rod and the cam surface of the cam member ring.

The foregoing and other features of the invention and advantages of the present invention will become more apparent in light of the following detailed description of the exemplary embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DESCRIPTION OF THE INVENTION

Figure 1:
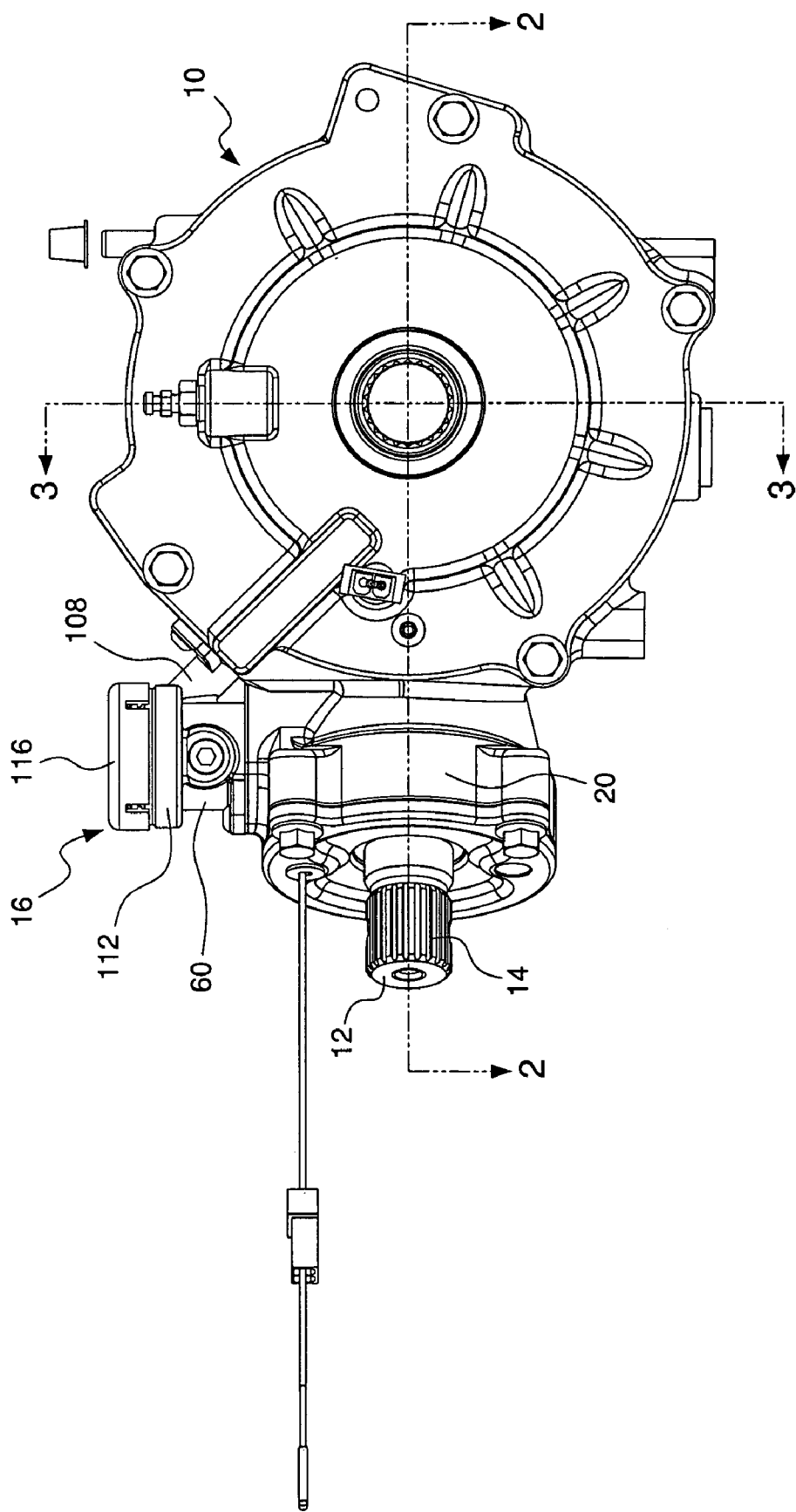
FIG. 1 is a side view of an overrunning clutch including a pump assembly according to the present invention.
Figure 2:
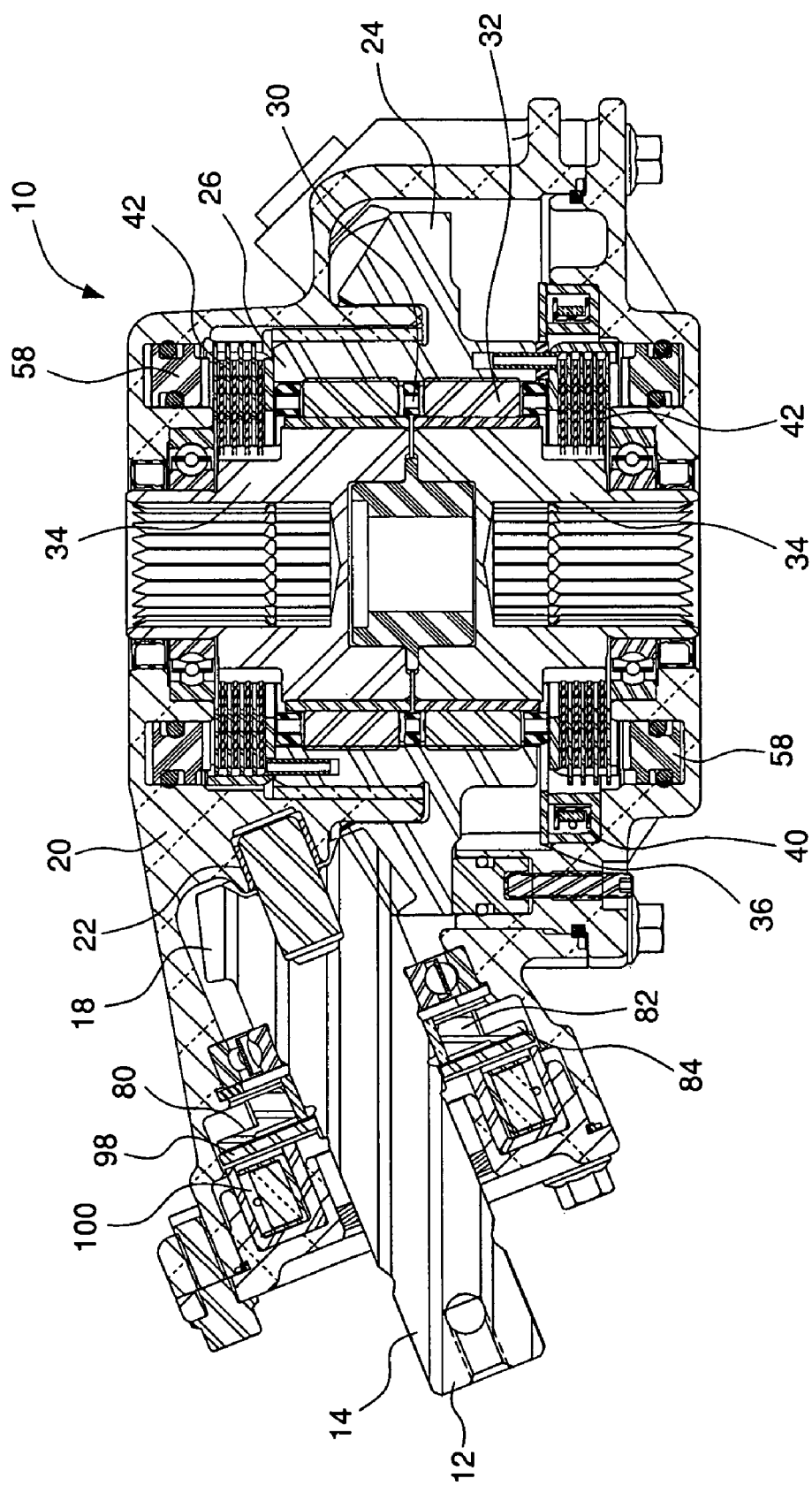
FIG. 2 is a sectional view taken along the line 2-2 of FIG. 1.
Figure 3:
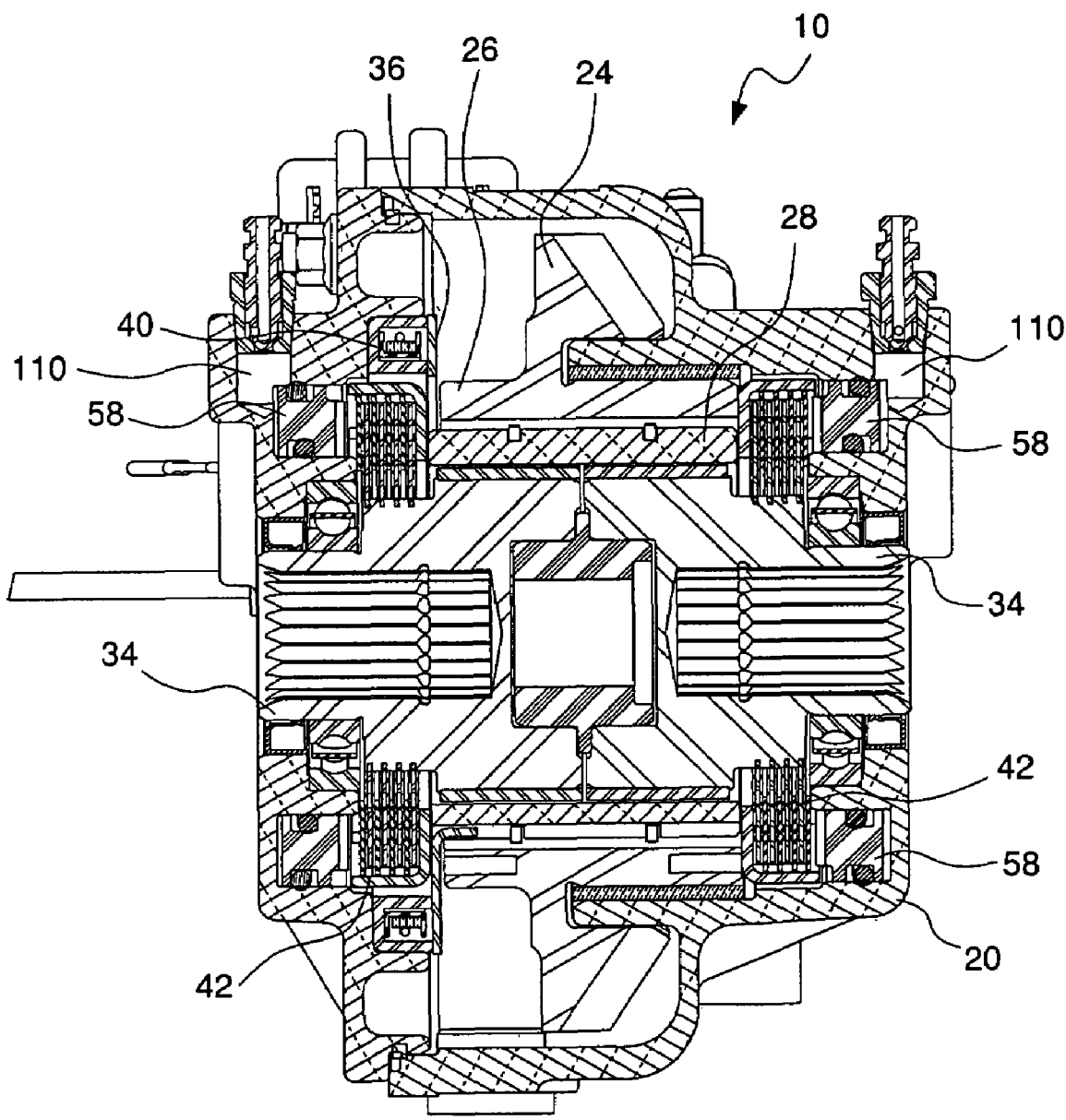
FIG. 3 is a sectional view taken along the line 3-3 of FIG. 1.

Referring to the drawings, where like numerals identify like elements, there is illustrated in FIGS. 1 through 3 a bi-directional overrunning clutch 10 according to the present invention. The overrunning clutch 10 includes a pinion input shaft 12 having a splined end 14 engageable with a driven shaft of a vehicle. The overrunning clutch 10 includes a pump assembly 16 adapted to pressurize a fluid, preferably a hydraulic fluid, in response to rotation of the pinion input shaft 12. As described in greater detail below, the pressurized hydraulic fluid provided by the pump assembly 16 of the present invention is used to actuate a backdriving feature of the overrunning clutch 10. By including the pump assembly 16 as part of the overrunning clutch 10, the present invention desirably eliminates the need for an external source of pressurized fluid.

Figure 4:
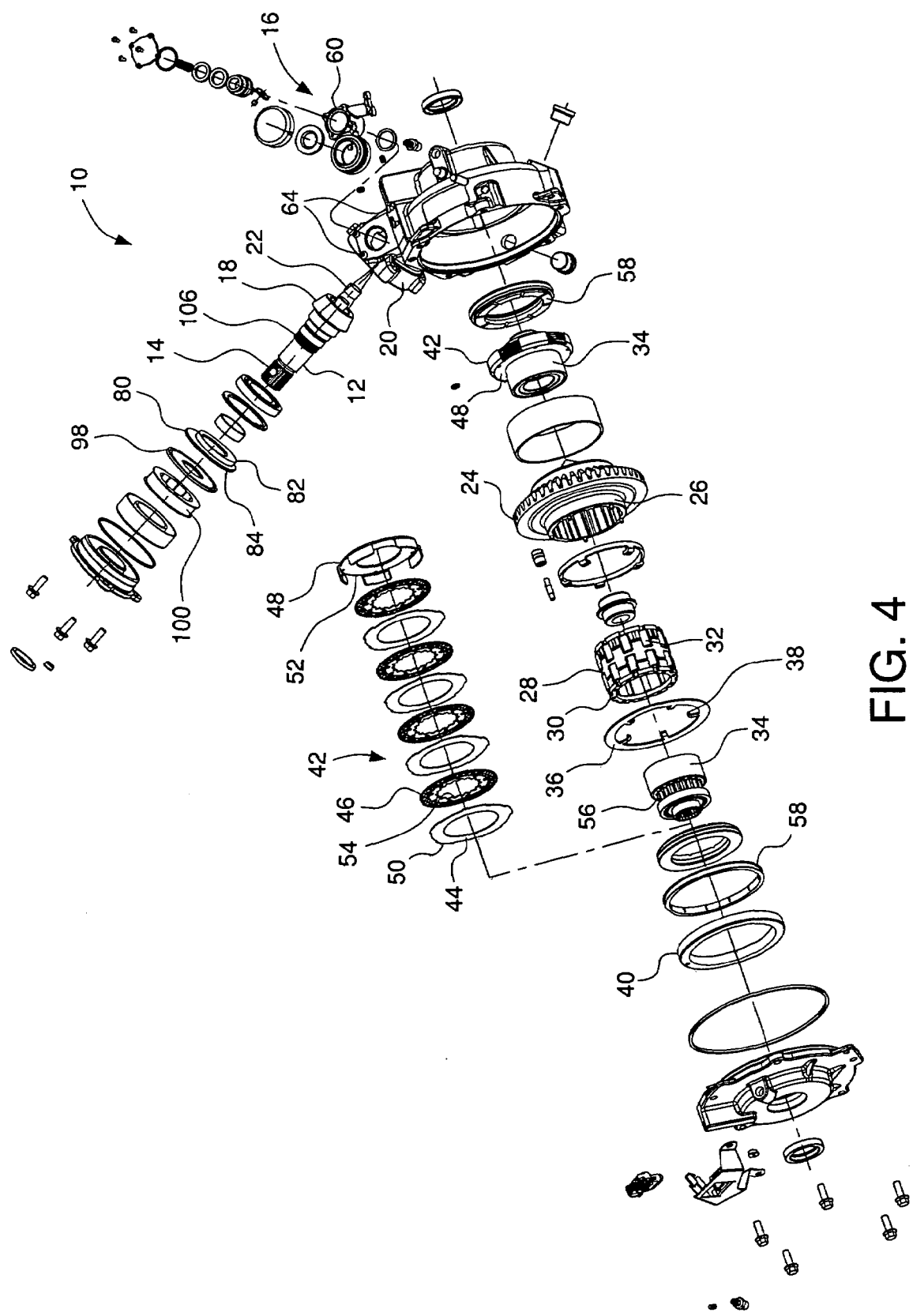
FIG. 4 is an exploded perspective view of the overrunning clutch of FIG. 1.
Figure 5:
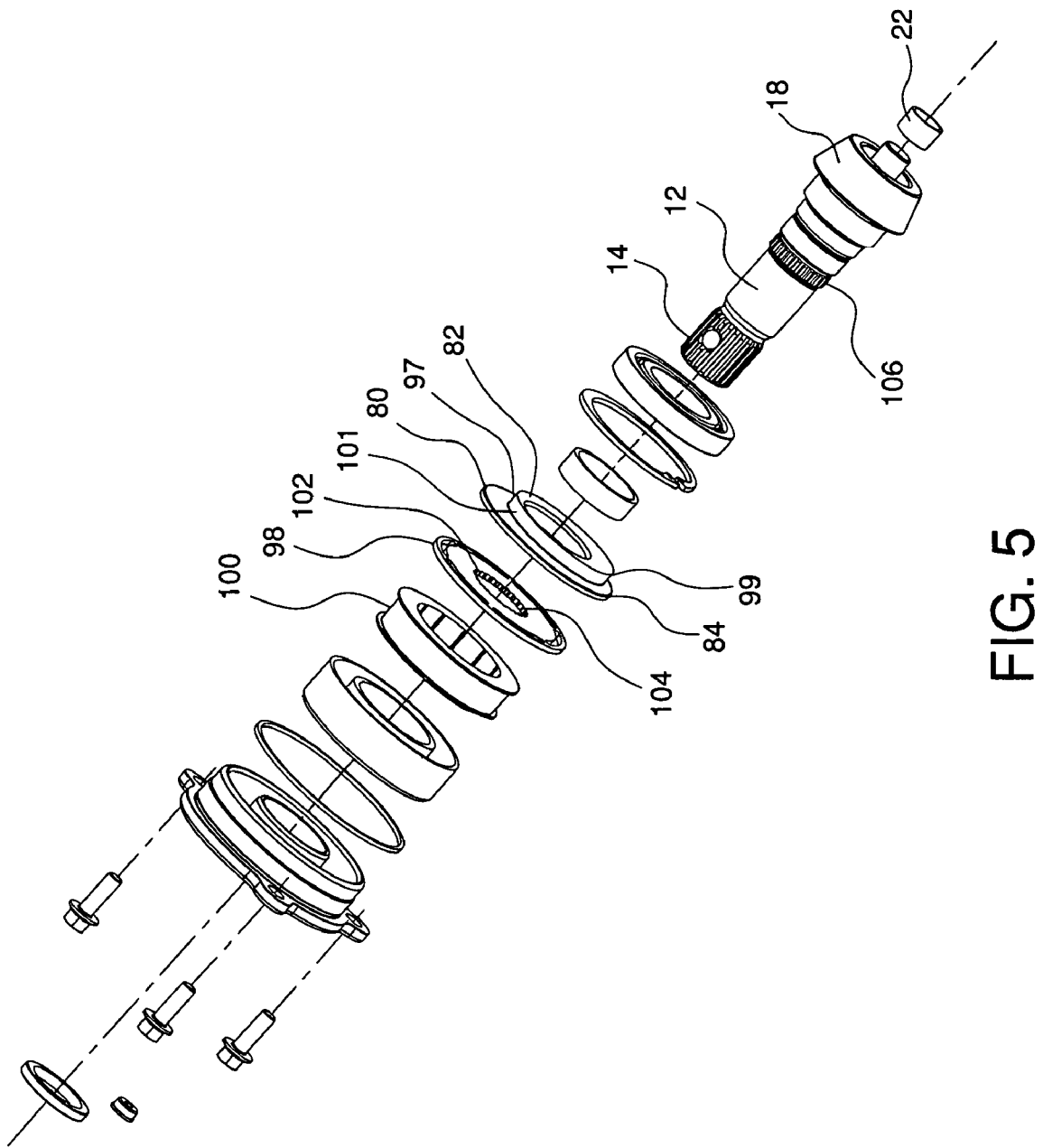
FIG. 5 is an enlarged perspective view showing a portion of the pump assembly of the overrunning clutch of FIG. 4.

Referring to FIGS. 2, 4, and 5, the pinion input shaft 12 includes a bevel gear 18. The bevel gear 18 is located adjacent or at an end of the pinion input shaft, which is received in a socket defined by a differential housing 20. A bushing 22 is located between the pinion input shaft 12 and the differential housing 20. The bevel gear 18 meshingly engages with a ring gear 24 so as to rotate the ring gear about an axis that is transverse to the rotational axis of the pinion input shaft 12. The ring gear 24 is carried on an exterior surface of a clutch housing 26 and is preferably formed integrally with the clutch housing 26.

Referring to FIGS. 2 through 4, the overrunning clutch 10 includes a roller assembly 28 having a roll cage 30 and a plurality of rolls 32. The rolls 32 of the roller assembly 28 are disposed within slots formed in the roll cage 30. The roller assembly 28 is received within an interior defined by the clutch housing 26. The roller assembly 28 is disposed about preferably a pair of races 34 as discussed in U.S. Pat. No. 6,622,837, wedging of the rolls 32 between the clutch housing 10 and the races 34 permits torque-transfer between the races 34 and the clutch housing 26. The construction and operation of the clutch housing 26, roller assembly 28 and races 34 of the overrunning clutch 10 is described in greater detail in U.S. Pat. No. 6,622,837, which is incorporated herein by reference in its entirety. As described in the '837 patent, the roller assembly 28 includes springs that position the roll cage 30 such that the rolls 32 float freely with respect to a contoured cam surface formed on the inner surface when the clutch 10 is in a non-activated condition.

The clutch 10 includes an armature plate 36, which is attached to the roll cage 30 by tangs 38, and a coil 40 which generates an electromagnetic field when the coil is activated. The electromagnetic field is designed to attract the armature plate 36 causing the armature plate 36 to drag. The drag placed on the armature plate 36 causes the attached roll cage 30 to shift with respect to the clutch housing 26 to an activated position in which torque-transmission between the clutch housing 26 and the races 34 is enabled. As described in the '837 patent, the rolls 32 of the roller assembly 28 will be maintained in a disengaged condition with respect to the cam surface of the clutch housing 26 as long as the clutch is in an overrunning mode (i.e., the races 34 are rotating faster than the clutch housing 26). However, when the clutch housing 26 rotates faster than the races 34, such as during slippage of primary drive wheels, the rolls 32 become wedged between the races 34 and the cam surface of the clutch housing 26 providing torque-transfer between the races 34 and the clutch housing 26. The rolls 32 are preferably arranged in sets of rolls, each engaging one of the races 34. This construction provides for independent engagement between the races 34 and the clutch housing 26, thereby providing the advantages of an open differential during vehicle cornering without traction loss.

Still referring to FIGS. 2 through 4, the overrunning clutch 10 also provides for engine braking ("backdriving" mode) for use when the vehicle is being driven down a steep descent. The overrunning clutch 10 includes a pair of clutch pack assemblies 42, each including friction plates 44 and drive plates 46 received by a clutch pack housing 48 and arranged in alternating fashion. The friction plates 44 include tabs 50 engaging notches 52 in the clutch pack housing 48. The drive plates 46 include splines 54 which preferably engage an output hub 56, which is integrally formed with an associated one of the races 34. The direct connection between the drive plates 46 and the output hub 56 in this manner eliminates the need for the adapter ring that was included in the clutch pack assembly of the '837 patent. The clutch pack assembly 42 also includes a hydraulic piston 58 actuated by pressure transmitted to the piston by a hydraulic fluid pressurized by the pump assembly 16 in the manner described below. The hydraulic piston 58 applies pressure to the plates 44, 46 such that the output hub 56 becomes engaged with the clutch pack housing 48. As described in the '837 patent, the clutch pack housing 48 is attached to the clutch housing 26 such that pressurization of the clutch pack assembly 42 engages the output hub 56 to the clutch housing 26 and the pinion input shaft 12. The operation of the clutch pack assembly 42, as well as systems for pressurizing and controlling the clutch pack assemblies 42, are described in greater detail in the '837 patent.

Figure 6:
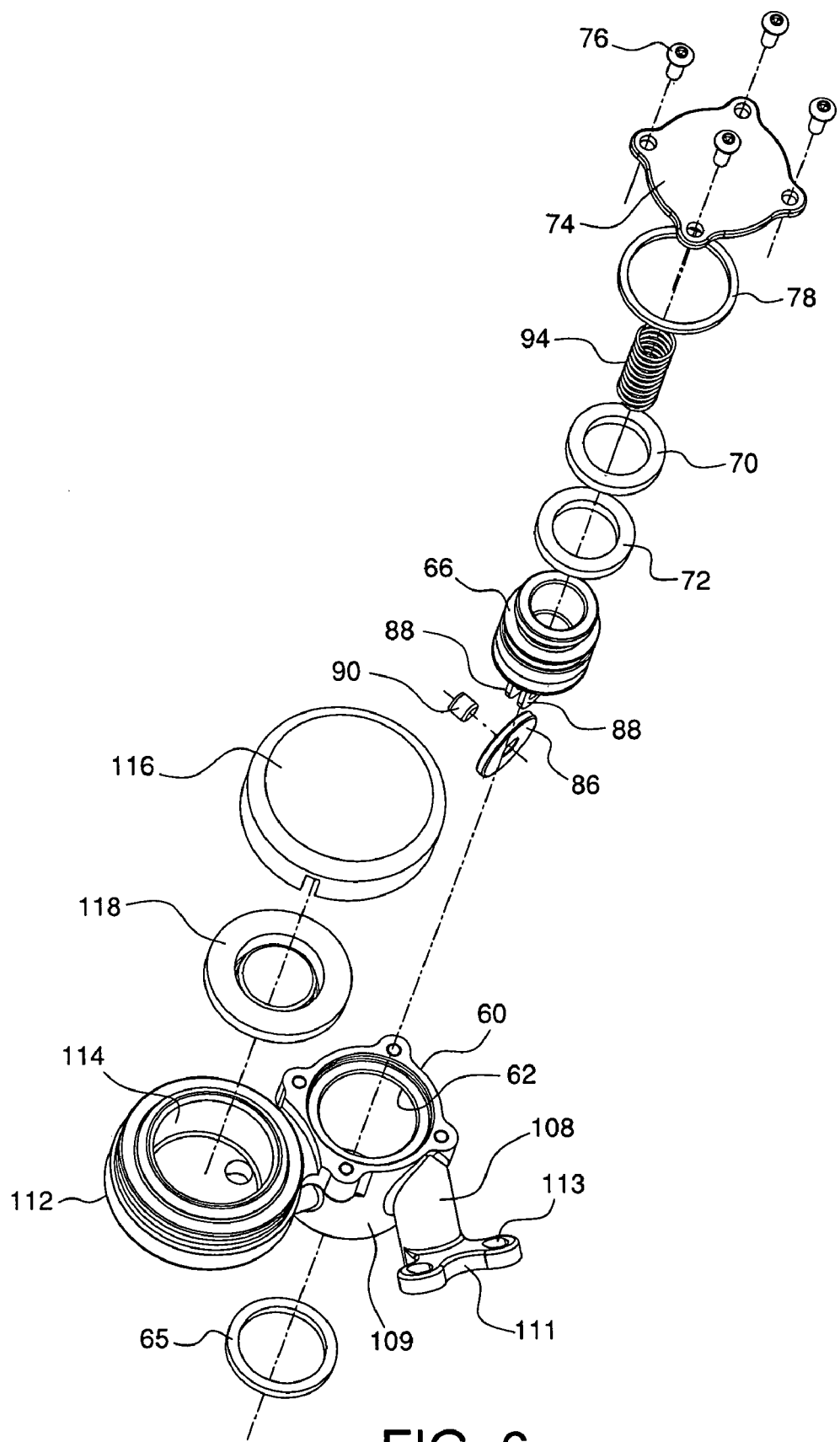
FIG. 6 is an enlarged perspective view showing another portion of the pump assembly of the overrunning clutch of FIG. 4.
Figure 7:
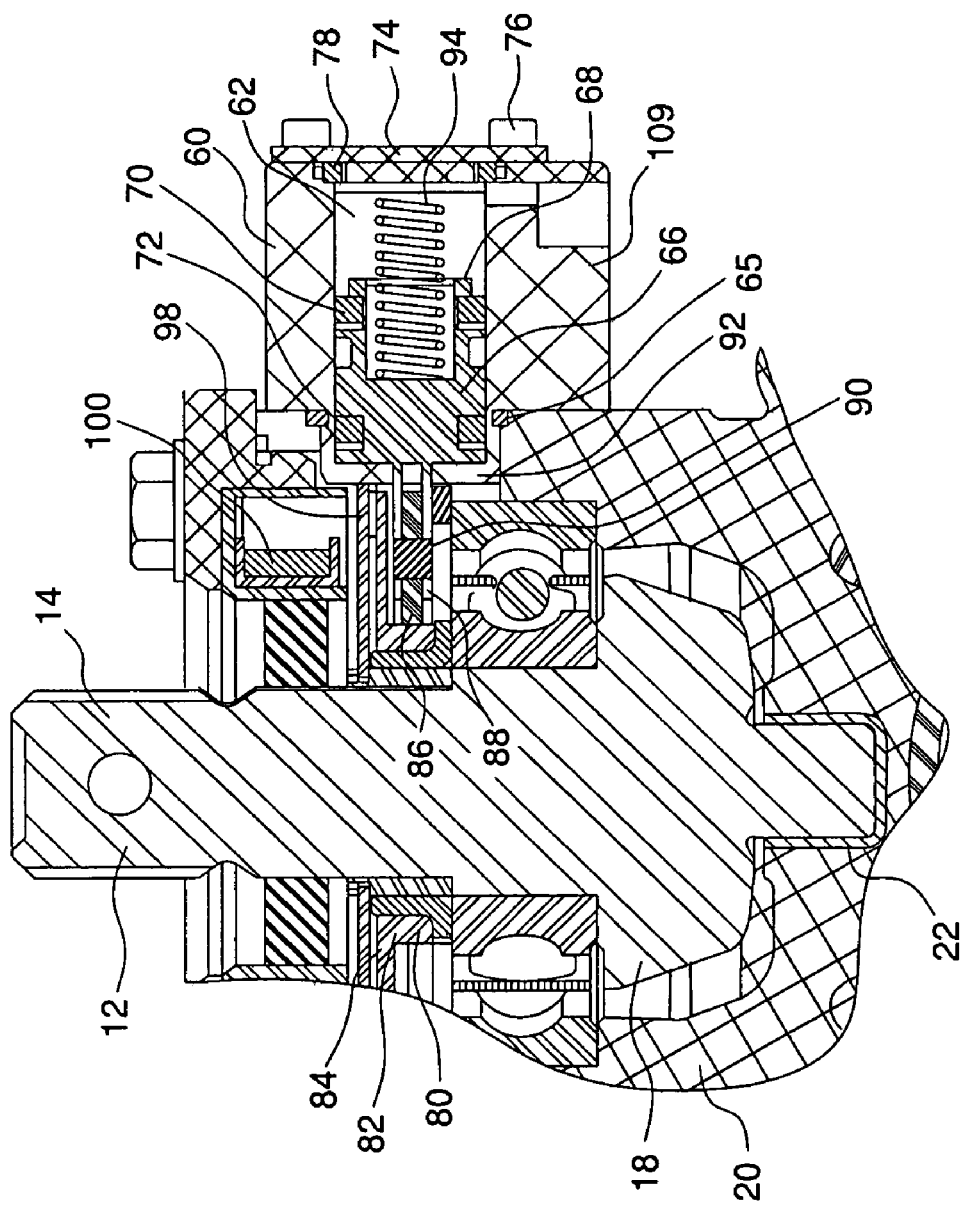
FIG. 7 is a sectional view of a portion of the pump assembly of FIG. 1.

Referring to FIGS. 1, 4, 6 and 7, one exemplary embodiment of the pump assembly 16 of the present invention is shown. The pump assembly 16 includes a master cylinder 60 defining an interior chamber 62. The master cylinder 60 is preferably secured to the differential housing 20 by bolts 64 (FIG. 4). As shown in FIG. 7, an inward end portion of the master cylinder 60 having a reduced outer diameter is received through an opening in the differential housing 20. An annular seal 65 is preferably located between the inward end portion of master cylinder 60 and the differential housing 20 to provide a seal between the master cylinder 60 and the differential housing 20.

The pump assembly 16 further includes a cylinder rod 66 having a head portion 68 slidably received within the interior chamber 62 of the master cylinder 60. The cylinder rod 66 preferably carries first and second seals 70, 72 received in glands formed in an outer surface of the cylinder rod 66. Alternately, the seals could be located in glands formed in the master cylinder 60. The seals 70, 72 provide a fluid-tight seal between the cylinder rod 66 and the master cylinder 60 for pressurizing a hydraulic fluid within the interior chamber 62. A cover 74 is preferably secured to the master cylinder 60 at an end of the interior chamber 62 opposite the cylinder rod 66 by bolts 76. A seal 78 may be included between the cover 74 and the master cylinder 60 to seal the end of the interior chamber 62.

The pump assembly 16 includes a cam member 80 rotatably received on the pinion input shaft 12. The cam member 80 includes a ring 82 that defines an outer cam surface adapted in the manner described below for driving the cylinder rod 66 with respect to the differential housing 20 and master cylinder 60. The movement of the cylinder rod 66 reduces the volume of the interior chamber 62 located between the cover 74 and the cylinder rod 66 to pressurize a hydraulic fluid within the interior chamber 62. The cam member also includes a back plate 84 connected to the ring 82 such that the ring extends from one side of the back plate 84. To provide a rolling contact with the cam surface of the cam member 80, the pump assembly 16 includes a follower 86 that is located between the cylinder rod 66 and the cam member ring 82. In the illustrated exemplary embodiment, the follower 86 is a roller disc. The roller disc 86 is rotatably supported between a pair of axle support members 88 that extend from an end of the cylinder rod 66 opposite the cover 74. An axle pin 90 is received in a central opening of the roller disc 86 and in aligned openings in the axle support members 88. It would be readily apparent to those skilled in the art that any suitable cam follower can be used in the present invention, including a contact pin or roller ball.

Referring to FIG. 7, the axle support members 88 extend through an opening in one end wall 92 of the master cylinder 60 so as to position the roller disc 86 to contact the cam member 80 when the master cylinder 60 is mounted to the differential. The pump assembly 16 includes a compression spring 94 which biases the cylinder rod 66 with respect to the differential housing 20 and master cylinder 60 to ensure contact between the roller disc 86 and the cam member 80. In the illustrated embodiment, one end of the compression spring 94 is received in a recess 96 formed in an end of the cylinder rod 66 opposite the roller disc 86. The other end of the compression spring 94 reacts against an inner surface of the cover 74 to bias the cylinder rod towards the cam member 80. The compression or return spring 94 ensures decompression of the device. Of course, other arrangements can be used for biasing the follower into contact with the cam surface, including use of a tension spring or simply the weight of the cylinder rod.

Figure 8:
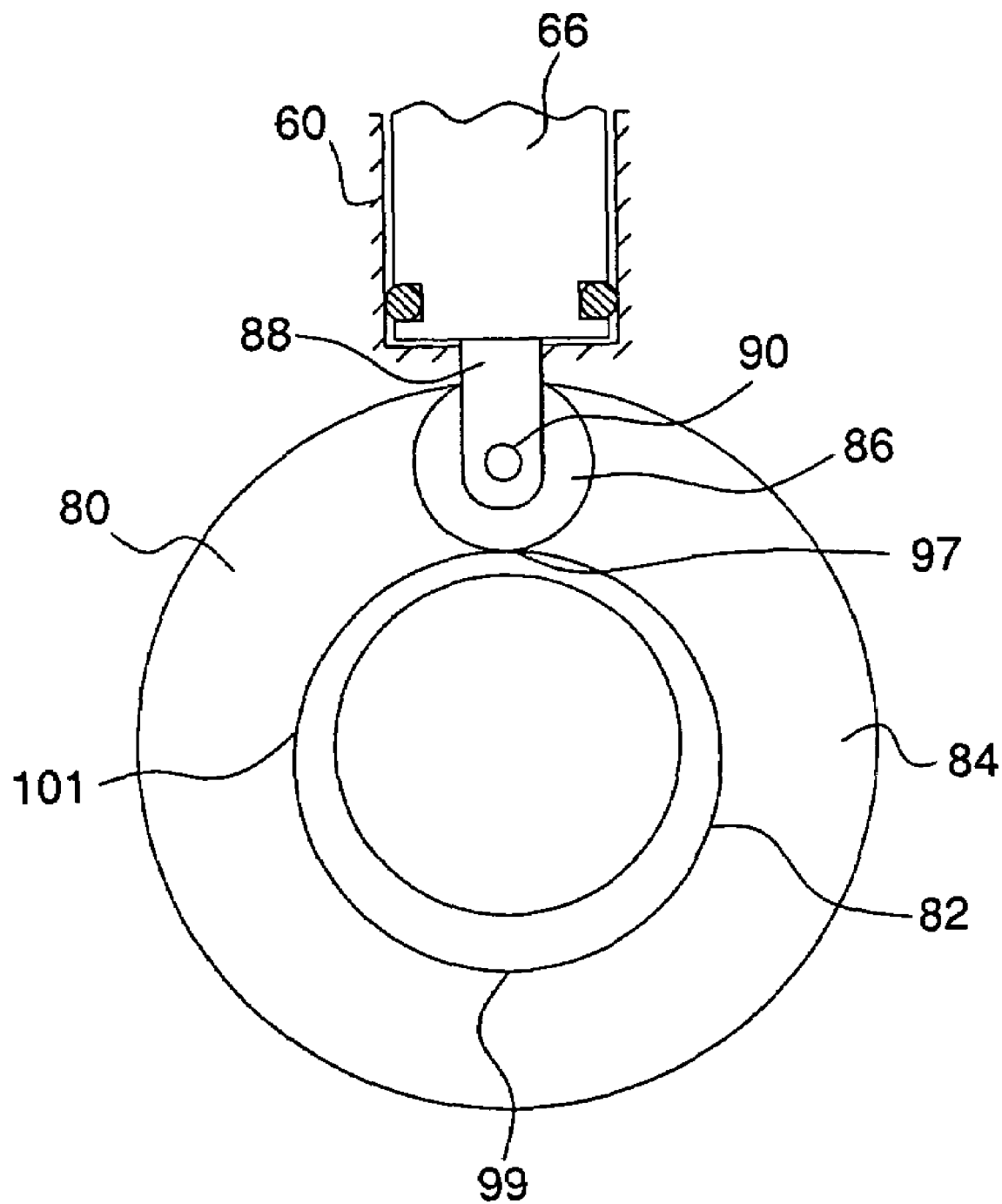
FIG. 8 is a view schematically illustrating the cam member, roller disc and cylinder rod of the pump assembly of FIG. 7 in the coil-inactivated condition.

Referring to FIG. 8, the cam surface of the cam member ring 82 has a radius that varies about the ring 82 between a minimum radius at location 97 and a maximum radius at location 99 opposite from location 97. The varying radius defines a ramped portion 101 of the cam surface in which the radius increases from location 97 to location 99. As described below in greater detail, the increasing radius in the ramped portion 101 of the cam surface drives the cylinder rod 66 outwardly when the cam member 80 is rotated with respect to the differential housing 20 to pressurize a hydraulic fluid in the master cylinder chamber 62. The cam is preferably symmetrical in design to provide operation in both forward and reverse directions.

The pump assembly 16 also includes an armature plate 98 and a coil 100 received on the pinion input shaft 12 such that the armature plate 98 is located between the coil 100 and the cam member 80. The coil 100 is disposed about the input shaft 12 such that the shaft 12 can rotate relative to the coil 100. The coil 100 generates a magnetic field when activated that attracts the armature plate 98 to the coil 100. The armature plate 98 includes splines 104 about a central opening 102 which engage with mating splines 106 on the pinion input shaft 12 such that the armature plate 98 rotates with the pinion input shaft 12. The engagement between the splines 104, 106 allows for a limited amount of longitudinal movement of the armature plate 98 with respect to the pinion input shaft 12. Alternately, the armature plate may be formed as an integral raised portion of the shaft.

The pump assembly 16 includes a coil-activated condition and a coil-inactivated condition. In the coil-inactivated condition, the rotation of the pinion input shaft 12 and armature plate 98 with respect to the differential housing 20 has substantially no effect on the cam member 80. In the coil-activated condition, the coil 100 is energized creating a magnetic field. The magnetic field from the coil 100 causes the armature plate 98 and cam member 80 to be drawn towards the coil 100 resulting in contact between the armature plate 98 and the back plate 84 of cam member 80. Friction and magnetic forces cause the cam member 80 to rotate with the armature plate 98 with respect to the differential housing 20 when the armature plate 98 is rotated by the pinion input shaft 12.

Referring to FIGS. 7 and 8, when the pump assembly 16 is in the coil-inactivated condition, the cam member 80 is positioned with respect to the master cylinder 60 such that the roller disc 86 contacts the cam surface of the cam member ring 82 potentially adjacent location 97. In this position, the relatively reduced radius of the cam surface adjacent location 97 allows the spring 94 to bias the cylinder rod 66 away from the cover 74. As shown in FIG. 7, an inward end of the cylinder rod 66 in this position is located adjacent to, and potentially in contact with, the inward end wall 92 of the master cylinder 60. This maximizes the volume within the master cylinder chamber 62 between the cylinder rod 66 and the cover 74. In this position, the hydraulic fluid located within the interior chamber 62 is not pressurized. While the pump assembly 16 is in the coil-inactivated condition, the cam member 80 is not engaged with the input shaft. As such, there is no direct rotation of the cam member 80 by the input shaft. Accordingly, the cylinder rod is not reciprocated within the master cylinder.

Figure 9:
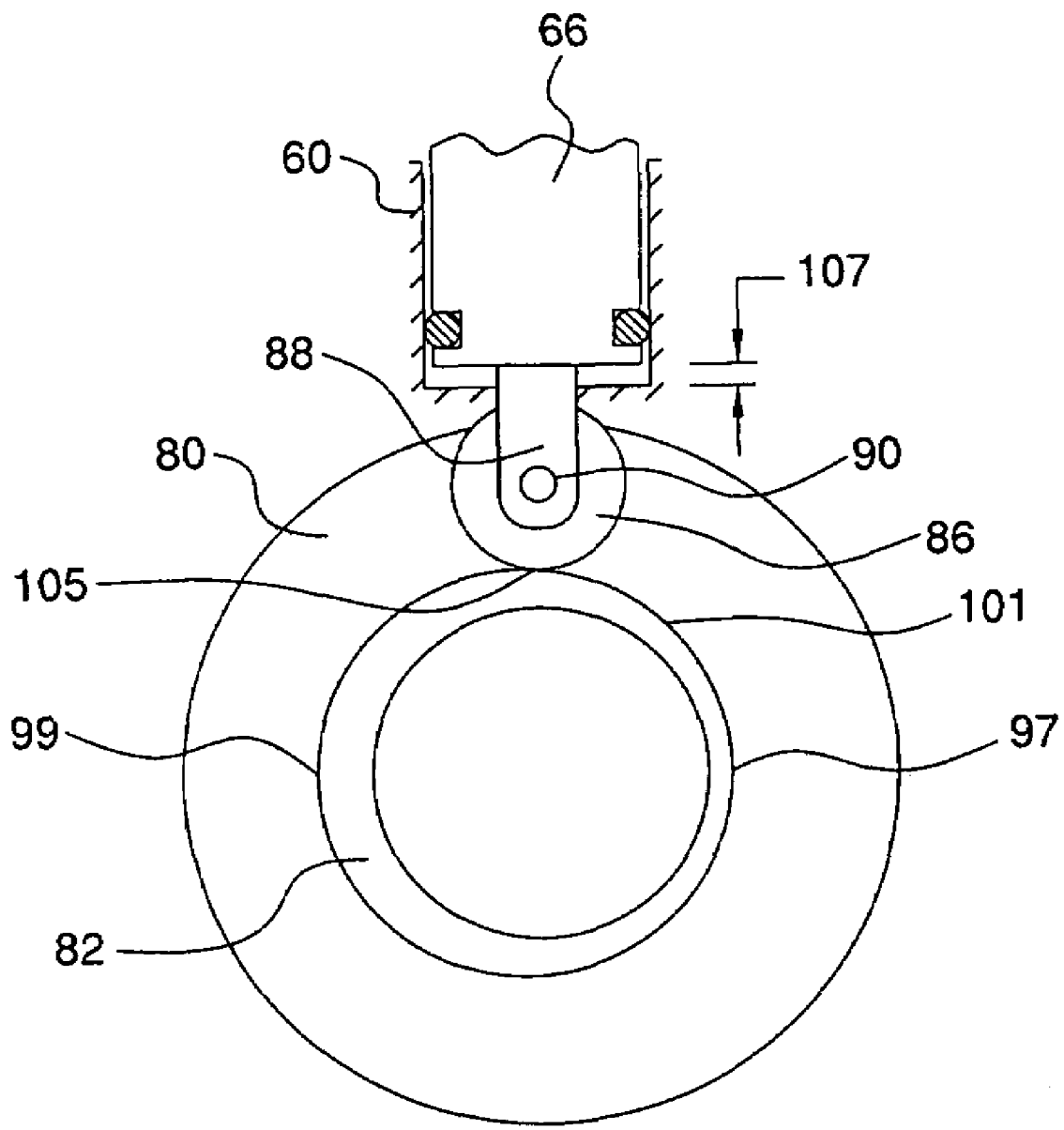
FIG. 9 is a view schematically illustrates the cam member, roller disc and cylinder rod of the pump assembly of FIG. 7 in the coil-activated condition.

Referring to FIG. 9, when the coil 100 is activated, the cam member 80 rotates with the armature plate 98 which, in turn, is engaged with the input shaft. As such, the cam member ring 82 rotates, causing the roller disc 86 to ride up the ramped portion 101. The contact between the roller disc 86 and the ramped portion 101 drives the cylinder rod 66 toward the cover, thereby pressurizing the hydraulic fluid within the interior chamber 62. The pressurization of the fluid within the master cylinder chamber 62 creates a reaction force between the roller disc 86 and the cam member ring 82. The profile of the cam member ring 82 is preferably dimensioned to cause the cam member 80 and armature plate 98 to slip with respect to each other in the coil-activated condition when the pressure within the master cylinder reaches a threshold level. At this level, the force that the roller disc 86 applies to the cam member ring 82 overcomes the frictional drag caused by the coil, thus permitting the input shaft and the armature plate to rotate relative to the cam member 80. The point at which this threshold occurs is schematically shown as location 105 along the ramped portion 101 between location 97 and location 99.

It should be understood that the magnitude of the pressure generated in the hydraulic fluid by the pump assembly 16 can be adjusted by varying the distance 107 that the cylinder rod 66 travels towards the master cylinder cover 74 from the coil-inactivated position of FIG. 7. This travel distance 107 of the cylinder rod 66 is hereinafter referred to as the "stroke distance". It should also be understood that the magnitude of the friction forces generated between the armature plate 98 and the cam member back plate 84 can be varied by varying input voltage to the coil 100. In this manner, the point at which slippage between the cam member 80 and the armature plate 98 occurs can be varied to adjust the rotation of the cam member 80, thereby adjusting the stroke distance 107 of cylinder rod 66. For example, a reduction of the coil voltage reduces the cam member rotation thereby reducing the stroke distance 107 and the associated hydraulic pressure.

Alternatively, the stroke distance 107 of the cylinder rod 66 could be controlled mechanically to force the slippage to occur at the predetermined location 105 rather than in the above-described manner. For example, a positive stop (such as a wall) could be included on the ramped portion 101 of the cam member ring 82 at the predetermined location 105 thereby preventing further rotation of the cam member 80 with respect to the differential housing 20.

It should be readily apparent that, if an accumulator is included in the system, then there is no need to provide for slippage of the cam member. Instead, the cam member could rotate continuously, causing the cylinder rod to repeatedly pressurize the hydraulic fluid. In this alternate embodiment, the surface of the cam member ring can be formed with multiple minimum and maximum radii, thus providing multiple low and high points on the cam profile and allowing multiple reciprocations for each rotation of the cam member. Suitable valving would be necessary to control the maintenance and supply of the pressurized fluid. It is also contemplated that the cam member can be replaced with a motorized pump, such as a continuous flow DC-operated pump, which would provide the pressure to the system. A reservoir would be used to store and supply the fluid.

Referring to FIGS. 4 and 6, the master cylinder 60 in the illustrated exemplary embodiment includes a main body 109 that defines the interior chamber 62 and an elongated extension 108 extending from the main body 109 at an oblique angle with respect to a central axis of the interior chamber 62. As shown, the master cylinder 60 includes a flange 111 located at a terminal end of the extension 108. The flange 111 includes a pair of openings 113 for receiving two of the bolts 64 that secure the master cylinder 60 to the differential housing 20. Additional bolts may be used to further attach the main body 109 to the differential housing.

The interior chamber 62 of the master cylinder 60 is preferably in fluid communication with the hydraulic pistons 58. In this manner, pressure generated in the master cylinder 60 can be transmitted to the clutch pack assemblies 42 contained within the interior of the differential housing as part of a backdriving feature. The use of the clutch pack assemblies to provide a backdriving feature is described in U.S. Pat. No. 6,622,837. The extension 108 of the master cylinder 60 defines an internal passage communicating with the interior chamber 62 of master cylinder 60. A fluid passage is provided from the internal passage of the extension 108 through internal passages 110 in the differential housing to the clutch pack assemblies. As shown in FIG. 3, the internal passages 110 of the differential housing 20 extend to communicate with the hydraulic pistons 58. In this manner, the pistons 58 are linked to the master cylinder interior chamber 62 for receipt of pressure that is transmitted from the master cylinder 60 in the hydraulic fluid. Alternatively, instead of using an extension 108 and internal passages 110, a hydraulic line can run externally from the master cylinder to the hydraulic piston 58.

Referring to FIGS. 1, 4, and 6, the pump assembly 16 includes a fill reservoir 112 connected to the master cylinder 60. The fill reservoir 112 defines an interior space 114 for receiving the hydraulic fluid. A cap 116 threadedly engages the fill reservoir 112 to enclose the interior space 114 of the fill reservoir 112. A diaphragm 118 is located between the cap 116 and the fill reservoir 112 to seal the interior space 114 of the reservoir when the cap 116 is threadedly engaged to the fill reservoir 112 and to keep the pressure atmospheric within the reservoir.

Activation of the coil may be manually controlled through a control system, such as an activation (e.g., toggle or push-button) switch. The switch can be located remote from the gear case in any suitable location on the vehicle. Alternately, the coil may be automatically activated upon activation of the backdrive as described in U.S. Pat. No. 6,622,837.

Also, while the above description has included a discussion of a system that automatically energizes and applies pressure to the hydraulic fluid, it is also envisions that the system could include a hand or foot activated master cylinder system. In this alternate embodiment, the harder hand or foot pressure is applied, the more pressure is applied to the system through the hydraulic fluid.

It should be readily apparent that, while the above discussion has described the use of the present invention for pressurizing a hydraulic fluid, other fluids, including gases, can be used, such as air or brake fluid. Also, while the present invention has been described as being useful for supplying pressurized fluid to a hydraulic piston in a clutch pack, the invention can be used to supply a pressurized fluid to other devices, such as wet brakes.

Figure 11:
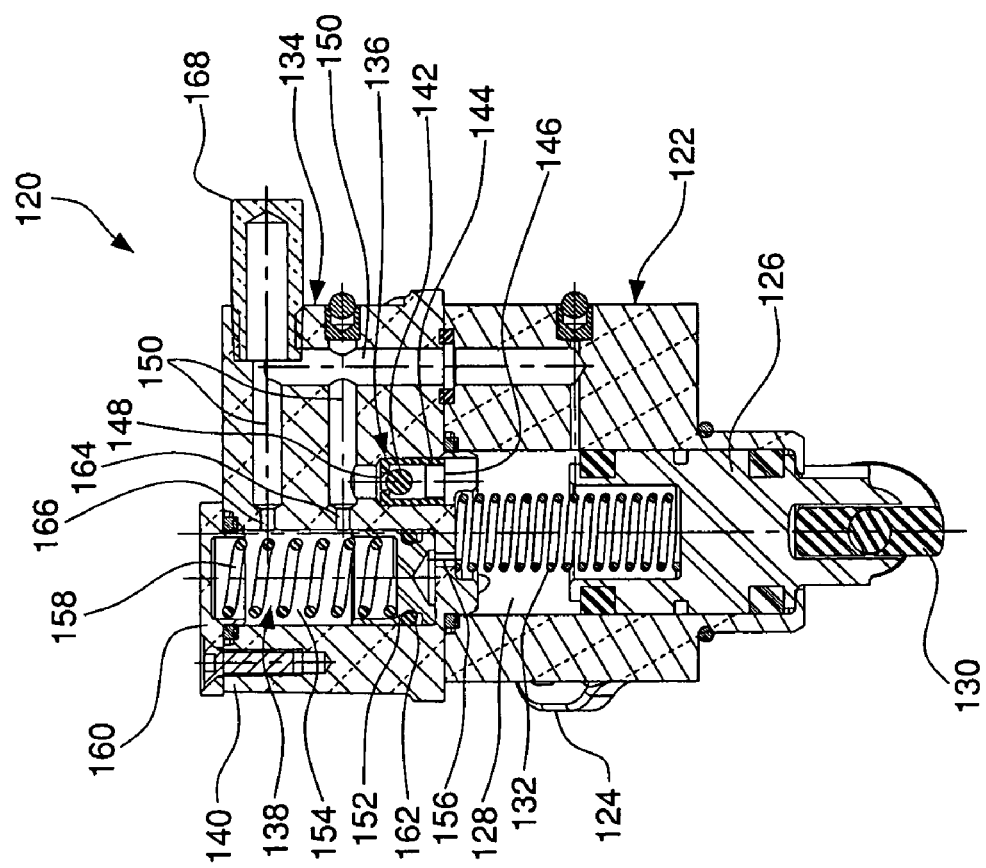
FIG. 11 is a sectional view of the pump assembly of FIG. 10.
Figure 10:
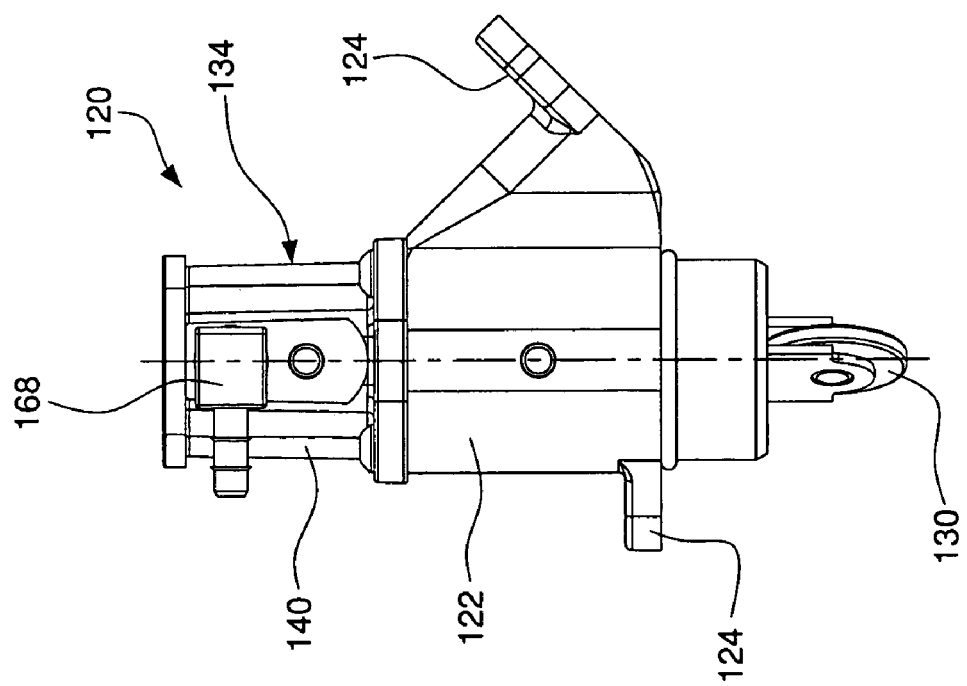
FIG. 10 is a side view of a pump assembly according to a second embodiment of the invention.

Referring to FIGS. 10 and 11, there is shown a pump assembly 120 according to a second embodiment of the invention. The pump assembly includes a master cylinder 122 having mounting flanges 124. The mounting flanges 124 are adapted to receive bolts to secure the master cylinder 122 to a differential housing. This is similar to the above-described master cylinder 60, which is secured to the differential housing 20 of pump assembly 16 by bolts 64. Also similar to pump assembly 16, the pump assembly 120 includes a cylinder rod 126 slidably located within an interior chamber 128 of the master cylinder 122, a follower in the form of a roller disc 130 mounted at an end of the cylinder rod 126, and a compression spring 132 received in a recess in an end of the cylinder rod 126 opposite the roller disc 130.

The pump assembly 120 also includes a pressure regulating system 134. The pressure regulating system 134 includes a shuttle valve 136 and a compensating valve 138 mounted within a housing 140. In the illustrated embodiment, the shuttle valve 136 is a ball check valve communicating with the interior chamber 128 of the master cylinder 122 and mounted above the cylinder rod 126. The ball check valve 136 includes a ball 142 located within an interior of a substantially cylindrical valve body 144. The valve body 144 is vertically-oriented (in the point of view shown in FIGS. 10 and 11) such that the ball is movable vertically with respect to the housing 140 in which the valve body 144 is mounted.

The body 144 of the ball check valve 136 includes a first port 146 defined at a lower end of the body 144 communicating with the master cylinder chamber 128 and a second port 148 at an opposite upper end of the body 144. The second port 148 of the shuttle valve body 144 communicates with passageways 150 of housing 140, which are described in greater detail below. As shown in FIG. 11, the second port 148 is relatively small compared to the ball 142. The ball 142 and the second port 148 are adapted such that contact between the ball 142 and the valve body 144 at the second port 148 (e.g., when the ball 142 is driven upwardly by positive pressure generated within the master cylinder chamber 128) seals the second port 148. The sealing of the second port 148 prevents a fluid (e.g., air or hydraulic fluid) from exiting the master cylinder chamber 128 via the second port 148, thereby allowing pressure in the master cylinder chamber 128 to build above the cylinder rod 126. When pressure in the master cylinder chamber 128 is returned to zero, as described below, gravity forces acting on the ball 142 cause the ball 142 to drop out of contact with the valve body 144 at the second port 148. This opens the second port 148, thereby providing free exchange of fluid through the shuttle valve 136 between the master cylinder chamber 128 and the housing passageways 150. As described, the shuttle valve 136 provides a spring-less construction having sealed and opened conditions.

The compensating valve 138 of the pressure regulating system 134 includes a piston 152 slidably mounted within a piston chamber 154 of housing 140. A bottom port 156 defined in housing 140 below the piston 152 communicates at one end with the piston chamber 154 of housing 140 and at an opposite end with the master cylinder chamber 128. A compression spring 158 located in the piston chamber 154 contacts an upper surface of the piston 152 and a removable cover 160 at opposite ends of the spring 158. The spring 158 urges the piston towards a bottom end of the piston chamber 154 when the pump assembly 120 is in a relaxed condition (i.e., zero pressure in the master cylinder chamber 128).

An annular seal 162 received on an outer surface of the piston 152 contacts the housing 140 within the piston chamber 154, thereby allowing positive pressure developed below the piston 152 to upwardly drive the piston 152 against the above-described biasing force of compression spring 158. As shown in FIG. 11, a pair of side ports in housing 140 include a first side port 164 and a second side port 166 located above the first side port 164 at a distance from the first side port 164. Each of the side ports 164, 166 communicates at one end with the piston chamber 154 and at an opposite end with one of the passageways 150 of housing 140.

The pressure regulating system 134 is arranged in the following manner. As discussed above, pressure generated within the master cylinder chamber 128 drives the ball 142 of shuttle valve 136 upwardly to seal the second port 148 of shuttle valve. Pressurized fluid (e.g., air or hydraulic fluid) from the master cylinder chamber 128, however, will be directed into the piston chamber 154 of compensating valve 138 below the piston 152 via the bottom port 156. The receipt of the pressurized fluid in the piston chamber 154 will drive the piston 152 upwardly within the piston chamber 154. If the piston 152 of compensating valve 138 is upwardly displaced beyond the first side port 164, the pressurized fluid is then directed into the passageways 150 of housing 140 via the first side port 164. As shown, the passageways 150 of housing 140 are arranged to communicate with an exit fitting 168 that is secured to housing 140. In this manner, the pressurized fluid directed into the housing passageways 150 from the compensating valve chamber 154 can be discharged from the housing 140 (e.g., to a reservoir that is not shown) via the exit fitting 168.

Preferably, the spring rate for compression spring 158 is selected such that the when the pressure behind the compensating valve piston 152 reaches an upper design pressure, the piston 152 will be sufficiently displaced to uncover the first side port 164 in the above described manner for communication between the piston chamber 154 and the housing passageways 150. When the first side port is uncovered, the pressurized fluid is permitted to flow out of the compensating valve 138 via the first side port 164, thus reducing the pressure below the piston 152 in the piston chamber 154 and in the master cylinder chamber 128. As the pressure drops below the upper design pressure, the piston will accordingly be returned downwardly with respect to the housing 140 because of the biasing force of compression spring 158. The downwardly moving piston will cover the first side port 164 again to block the communication between the piston 154 and the housing passageways 150, thereby maintaining pressure below the piston 152.

The second side port 166, which is located above the first side port 164, communicates with the housing passageways 150, allowing fluid to be directed to the exit fitting 168 from the piston chamber 154 (i.e., for discharge to a reservoir). The removal of the fluid via the second side port 166 in this manner prevents the fluid from becoming trapped in the piston chamber 154 above the piston 152 thereby ensuring proper operation of the compensating valve 138.

As described, the compensating valve 138 regulates the pressure generated within the master cylinder chamber 128 below a desired design pressure, thereby preventing pressure spikes within the pump assembly 120. The compensating valve 138 also functions as a pressure accumulator by directing pressurized fluid from the housing 140 to a reservoir.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A pump assembly and differential clutch assembly combination, the pump assembly adapted to pressurize a hydraulic fluid for supply to an overrunning clutch in the differential clutch assembly, the differential assembly comprising:
    a differential housing;
    an input shaft extending out of the housing and having a rotational axis;
    at least one output shaft extending out of the housing;
    an overrunning clutch located within the housing and selectively engaged with the input shaft and the at least one output shaft, the overrunning clutch for transferring torque between the input shaft and the at least one output shaft, the overrunning clutch including a hydraulically controlled backdriving assembly; and
    a hydraulically actuatable mechanism for supplying pressurized hydraulic fluid to the backdriving assembly for selective engagement of the overrunning clutch with the at least one output shaft; and
    the pump assembly comprising:
    a pump housing defining an interior and mounted to the differential housing, the pump housing includes a port for permitting pressurized fluid to channel out of the pump housing;
    a fluid passage extending between the port and the hydraulically actuatable mechanism for channeling pressurized fluid to the hydraulically actuatable mechanism;
    a cylinder rod slidingly received within the interior of the pump housing for pressurizing a hydraulic fluid, the rod having a longitudinal axis substantially perpendicular to the rotational axis of the input shaft;
    an annular cam member disposed about the input shaft and adapted for selective engagement with the input shaft such that the input shaft is capable of independent rotation relative to the cam member when the cam member is not engaged to the input shaft, and the cam member and input shaft rotate together when the cam member is engaged with the input shaft, the cam member including a cam surface adapted to drivingly slide the cylinder rod within the pump housing upon relative movement of the cam member with respect to the pump housing;
    a rotation coupler engaged with the shaft such that the rotation coupler rotates with the shaft, the rotation coupler adapted for selective engagement with the cam member such that upon engagement rotation of the shaft results in relative movement between the cam member and the pump housing to slide the cylinder rod with respect to the pump housing and pressurize a hydraulic; and
    a coil adapted to generate an electromagnetic field upon activation, the coil mounted near the rotation coupler, wherein the selective engagement between the rotation coupler and the cam member is provided by activation of the coil so as to generate an electromagnetic field to cause the cam member and the rotation coupler to be drawn into contact with each other.

2. The pump assembly and differential clutch assembly combination according to claim 1, wherein the cam member includes a cam surface and a back plate with a surface adapted for contact with the rotation coupler.

3. The pump assembly and differential clutch assembly combination according to claim 2, wherein the contact surface of the cam member back plate is located on the opposite side of the back plate from the cam surface.

4. The pump assembly and differential clutch assembly combination according to claim 2, wherein the outer surface of the cam surface includes a ramped portion having a radius that varies along a length of the ramped portion.

5. The pump assembly and differential clutch assembly combination according to claim 1, wherein the cam member includes a cam surface having a radius that varies in substantially continuous manner about at least a portion of cam surface.

6. The pump assembly and differential clutch assembly combination according to claim 1, wherein the cylinder rod includes a first portion with a piston head adapted for sliding receipt within the pump, housing interior and a second portion including a contact member adapted for contact with the cam surface of the cam member.

7. The pump assembly and differential clutch assembly combination according to claim 6, wherein the contact member is a disk having a substantially circular peripheral edge, and wherein the second portion of the cylinder rod includes at least one elongated support member, the disk being rotatably connected to the elongated support member so as to permit rolling contact between the cam surface of the cam member and the disk.

8. The pump assembly and differential clutch assembly combination according to claim 1 further comprising a spring located between the cylinder rod and the pump housing to bias the cylinder rod towards the cam member.

9. The pump assembly and differential clutch assembly combination according to claim 8, wherein an end of the spring is received within a recess formed in the cylinder rod.

10. The pump assembly and differential clutch assembly combination according to claim 1 further comprising a pressure regulating system coupled to the pump housing and adapted to limit a pressure for the hydraulic fluid below a design pressure.

11. A pump assembly comprising:
a pump housing defining an interior;
a cylinder rod slidingly received within the interior of the pump housing for pressurizing a hydraulic fluid;
a cam member adapted for receipt on a shaft such that the shaft is capable of relative rotation with respect to the cam member about a central axis defined by the shaft, the cam member including a cam surface adapted to drivingly slide the cylinder rod with respect to the pump housing upon relative movement of the cam member with respect to the pump housing;
a rotation coupler carried by the shaft such that the rotation coupler rotates with the shaft, the rotation coupler adapted for limited engagement with the cam member such that rotation of the shaft results in relative movement between the cam member and the pump housing to slide the cylinder rod with respect to the pump housing and pressurize a hydraulic fluid; and
a coil adapted to generate a magnetic field, and wherein the rotation coupler and the cam member are drawn into contact with each other in response to the electromagnetic field generated by the coil such that the cam member is frictionally engaged to the rotation coupler;
wherein the rotation coupler includes an armature plate having a central opening in which the shaft is received, the armature plate including splines spaced about the central opening for torque-transferring engagement with a splined portion of the shaft.

12. A pump assembly comprising:
a pump housing defining an interior;
a cylinder rod slidingly received within the interior of the pump housing for pressurizing a hydraulic fluid;
a cam member adapted for receipt on a shaft such that the shaft is capable of relative rotation with respect to the cam member about a central axis defined by the shaft, the cam member including a cam surface adapted to drivingly slide the cylinder rod with respect to the pump housing upon relative movement of the cam member with respect to the pump housing;
a rotation coupler carried by the shaft such that the rotation coupler rotates with the shaft, the rotation coupler adapted for limited engagement with the cam member such that rotation of the shaft results in relative movement between the cam member and the pump housing to slide the cylinder rod with respect to the pump housing and pressurize a hydraulic fluid;
wherein the pump assembly is mounted to a differential clutch, wherein the pump housing includes a port for permitting pressurized fluid to channel out of the pump housing, and further comprising a fluid passage extending between the port and a hydraulic piston in the differential for channeling pressurized fluid to the hydraulic piston.

13. A pump assembly comprising:
a pump housing defining an interior;
a cylinder rod slidingly received within the interior of the pump housing for pressurizing a hydraulic fluid;
a cam member adapted for receipt on a shaft such that the shaft is capable of relative rotation with respect to the cam member about a central axis defined by the shaft, the cam member including a cam surface adapted to drivingly slide the cylinder rod with respect to the pump housing upon relative movement of the cam member with respect to the pump housing;
a rotation coupler carried by the shaft such that the rotation coupler rotates with the shaft, the rotation coupler adapted for limited engagement with the cam member such that rotation of the shaft results in relative movement between the cam member and the pump housing to slide the cylinder rod with respect to the pump housing and pressurize a hydraulic fluid;
a pressure regulating system coupled to the pump housing and adapted to limit a pressure for the hydraulic fluid below a design pressure;
wherein the pressure regulating system includes a valve housing and a compensating valve, the compensating valve including a piston slidable within a piston chamber defined by the valve housing, the piston chamber adapted to receive a pressurized hydraulic fluid from the interior of the pump housing, the piston responsive to the pressurized hydraulic fluid to move towards a pressure-relieving position for the piston, the compensating valve adapted to discharge pressurized fluid from the piston chamber when the piston is in the pressure-relieving position to limit the pressure of the hydraulic fluid below the design pressure.

14. The pump assembly according to claim 13, wherein the pressure regulating system includes a shuttle valve having an interior communicating with the interior of the pump housing and with at least one passageway defined by the valve housing, the shuttle valve including a seal member movably received within the interior of the shuttle valve and adapted for movement between an opened condition in which hydraulic fluid can pass through the shuttle valve interior and a closed condition in which passage of the hydraulic fluid through the shuttle valve is prevented.

15. The pump assembly according to claim 14, wherein the shuttle valve is a ball check valve and the seal member is a ball movable within a substantially cylindrical body of the valve.

16. A clutch assembly for a vehicle comprising:
a differential housing defining an interior;
an input shaft rotatably supported within the interior of the differential housing, the input shaft adapted for engagement with a drive system of the vehicle for rotation of the input shaft by the drive system;
a pump master cylinder, the pump master cylinder defining an interior chamber for receipt of a hydraulic fluid to be pressurized therein;
a cylinder rod slidingly received within the interior chamber of the pump master cylinder in fluid-tight relation to an inner surface of the pump master cylinder;
a cam member defining a central opening receiving the input shaft such that the cam member is rotatably supported by the input shaft, the cam member including a ring and a back plate, the ring connected to the back plate such that the ring extends from one side of the back plate, the ring including an outer cam surface having a radius that varies about a circumference of the ring including at least one ramped portion;
an armature plate defining a central opening receiving the input shaft such that the armature plate is located next to back plate of the cam member, the armature plate and the input shaft engaged to each other such that the armature plate rotates with the input shaft; and
a coil located next to the armature plate and generating an electromagnetic field when activated such that the cam member and the armature plate are drawn into contact with each other, the contact resulting in friction force between the armature plate and cam member back plate during rotation of the armature plate by the input shaft such that the cam member is rotated with respect to the differential housing,
the cylinder rod and cam member arranged such that the cylinder rod is driven by one of the at least one ramped portions of the cam member when the coil is activated to rotate the cam member with respect to the differential housing.

17. The clutch assembly according to claim 16, wherein the armature plate and cam member are adapted to slip with respect to each other at a predetermined location along the ramped portion of the cam surface.

18. The clutch assembly according to claim 17, wherein the predetermined location along the ramped portion associated with slippage between the armature plate and cam member is adjustable by varying an input voltage supplied to the coil to increase or decrease the strength of the electromagnetic field generated by the coil.

19. The clutch assembly according to claim 16, wherein the armature plate includes splines arranged about the central opening of the armature plate, the splines of the armature plate engaged to a splined portion of the input shaft.

20. The clutch assembly according to claim 16, further comprising a roller disc rotatably supported at one end of the cylinder rod to provide rolling contact between the cylinder rod and the cam surface of the cam member.

21. The clutch assembly according to claim 16 further comprising a backdriving system including at least one hydraulic piston adapted for actuation by a pressurized hydraulic fluid, the hydraulic piston in fluid communication with the interior chamber of the pump master cylinder for actuation of the hydraulic piston by pressure generated by the cylinder rod in the pump master cylinder chamber and transmitted to the hydraulic piston.

22. The clutch assembly according to claim 21, wherein the backdriving system includes a clutch pack assembly associated with each hydraulic piston, the clutch pack assembly including a plurality of friction plates adapted for rotation with a race and a plurality of drive plates adapted for rotation with a clutch pack housing.

23. The clutch assembly according to claim 16 further comprising a pressure regulating system including a valve housing secured to the pump master cylinder, the pressure regulating system including a compensating valve having a piston slidingly received within a piston chamber defined by the valve housing, the piston chamber adapted to receive a pressurized hydraulic fluid from the pump master cylinder, the piston responsive to the pressurized hydraulic fluid to move towards a pressure-relieving position for the piston, the compensating valve adapted to discharge pressurized fluid from the piston chamber when the piston is in the pressure-relieving position to limit the pressure of the hydraulic fluid below a maximum pressure.

* * * * *